United States Patent [19]

Bottomley

[11] Patent Number: 5,008,376

[45] Date of Patent: Apr. 16, 1991

[54] PROCESS FOR OBTAINING CONCENTRATES HAVING A HIGH α-LACTALBUMIN CONTENT FROM WHEY

[75] Inventor: Robin C. Bottomley, Bucks, England

[73] Assignee: Express Foods Group Limited, Middlesex, England

[21] Appl. No.: 250,403

[22] Filed: Sep. 28, 1988

[30] Foreign Application Priority Data

Oct. 8, 1987 [GB] United Kingdom ............... 8723651

[51] Int. Cl.$^5$ .................................................. C07K 3/26
[52] U.S. Cl. ..................................... 530/366; 530/386; 530/833
[58] Field of Search ..................... 530/366, 833, 386

[56] References Cited

U.S. PATENT DOCUMENTS 4,485,040 11/1984 Roger et al. ................. 530/833
4,528,203 7/1985 Harris et al. .
4,834,974 5/1989 Stott et al. ................... 514/2

FOREIGN PATENT DOCUMENTS 0022696 1/1981 European Pat. Off. .
8808673 11/1988 PCT Int'l Appl. .

OTHER PUBLICATIONS

Pierre & Fauquant, "Principles pour un Procede, Industriel de Fractionnement des Proteines du Lactoserum", Le Lait, vol. 66 (No. 4), pp. 405–419, 1986.
J. L. Maubois et al., "Industrial Fractionation of Main Whey Proteins", Dairy Research Laboratory, I.N.R.A., International Whey Conference, Chicago, Oct. 27–29th, 1986; printed in the *Bulletin of the International Dairy Federation*, No. 212 (1987), pp. 154–159.
Kuwata et al. "Elimination of β-Lactoglobulin from Whey to Simulate Human Milk Protein", *Journal of Food Science*, vol. 50 (1985) pp. 607–609.
Lee et al. "Prefiltration of Cottage Cheese Whey to Reduce Fouling of Ultrafiltration Membranes", *Jour. of Food Science*, vol. 41 (1976) pp. 403–409.
Technical Brochure copies from Koch, (Abcor), Romicon, and Amicon relating to permeable membranes.
Nielsen et al., "Four Factor Response Surface Experimental Design . . . ", *Journal of Dairy Science*, vol. 56; No. 1, pp. 76–83.
Pearce, "Thermal Separation of β-Lactoglobulin and α-Lactalbumin in Bovine Cheddar Cheese Whey", *Australian Journal of Dairy Technology*, Dec. 1983, pp. 144–148.

*Primary Examiner*—Howard E. Schain
*Assistant Examiner*—Choon P. Koh
*Attorney, Agent, or Firm*—Beveridge, DeGrandi & Weilacher

[57] ABSTRACT

The invention is concerned with a process for producing an α-lactalbumin-enhanced fraction from a liquid containing whey protein including α-lactalbumin and β-lactoglobulin which comprises subjecting said liquid to ultrafiltration using a membrane having a molecular weight cut off of essentially 100,000 to form a permeate having a protein content in which the proportion of α-lactalbumin is enhanced relative to the proportion obtaining in the protein content of said liquid.

9 Claims, 1 Drawing Sheet

PROCESS FOR OBTAINING CONCENTRATES HAVING A HIGH α-LACTALBUMIN CONTENT FROM WHEY

BACKGROUND OF THE INVENTION

The present invention relates to the production of whey protein concentrates having an enhanced α-lactalbumin content.

The isolation of individual proteins from various starting materials is well known. Most individual proteins are recovered from a mixture thereof by using differences in the physical and/or chemical properties of the proteins to advantage. Such isolation processes have usually required a multi-stage process with its attendant expense and difficulty in scaling up to an industrial process.

Whey contains many proteins with excellent properties which are also of a high nutritional value. Their large scale production in the form of wey protein concentrates only became possible with the advent in the early 1970s of ultrafiltration technology, and they have become increasingly important in satisfying the needs of the food, dietetic and pharmaceutical industries. Whey protein concentrates in power form containing all the whey proteins are currently produced by membrane ultrafiltration followed by spray drying. The concentrates generally have a protein content ranging from 35% to 85%, although lesser or greater amounts of protein can be present.

Such concentrates contain residual non-centrifugeable lipids, principally phospholipids, together with milk lipids and some phospholipoproteins. These lipoproteins concentrate at the same rate as the other proteins and have amphoteric and amphiphilic properties which lead to their being strongly adsorbed on membrane materials used in ultrafiltration, which was reported to cause irreversible fouling. For this reason Lee and Merson (J.Food Sc.41, 402–410) suggested prefiltration of whey to reduce this fouling.

Numerous methods have already been proposed to separate individual whey proteins, but most have not been capable of scaling up to industrially viable processes because of their complexity, their cost in energy, their very low yield and the irremediable degradation of the products due to the use of intensive heat treatments (Nielsen et al., J.Dairy Science 56 76–83 1973) very alkaline pH (Harris and Yoell, 1985) or of high amounts of salts (Kuwata et al., J.Food Science 50 605–609 1985).

Pearce (Aust.J.Dairy Technol. 38 144–149 1983) has proposed purification of α-lactalbumin based on the low pH solubility of α-lactalbumin under a light heat treatment. However, the α-lactalbumin fraction produced by this process has been reported by J.L. Maubois et al. of the Dairy Research Laboratory I.N.R.A. at the WPI/IDF International Whey Conference in Chicago, 27th–29th Oct. 1986 to be unsatisfactory due to the high degree of association of the whey lipids and lipoproteins with α-lactalbumin.

J.L. Maubois et al proposed a clarification process which produces a clarified whey which, when subjected to ultrafiltration produces a whey protein concentrate which they suggest is the right product for separation of individual proteins therefrom.

The clarification process has as its object the removal of the lipoproteins using their ability to aggregate through calcium bonding under heat treatment. The clarification process involves six stages which are:
1. cooling the whey to a temperature of 2° C.;
2. adjusting the calcium content to 1.2g/kg by addition of $CaCl_2$;
3. raising the pH of the so-treated whey to 7.3 by addition of NaOH;
4. rapidly raising the temperature of the so-treated whey to 55° C.;
5. maintaining the whey at this temperature for a period of eight minutes;
6. separating the supernatant from the precipitate by tangential microfiltration (Maubois et al indicated that tangential microfiltration was resorted to because filtration through screen plates led to loss of lipoproteins to the filtrate, and centrifugation was found to be hopelessly inefficient).

The whey, clarified in the above rather complex manner was then subjected by Maubois et al to ultrafiltration to produce a whey protein concentrate. To obtain α-lactalbumin from this concentrate they chose the method described by Pierre & Fauquant in Lait (1986). The details are fully set out in the Maubois et al publication. The method involves the gelling of α-lactalbumin by heating to 55°–65° for 30 minutes at a pH of ~4 for concentrates having an α-lactalbumin content of more than 2g/kg. Maubois et al observed that the supernatant resulting from the gelling contained β-lactogloubulin and that this could be realized in high purity by diafiltration on a UF membrane having a molecular weight cut off of 50,000. For separation of β-lactoglobulin from the gelled α-lactalbumin however, they suggested only that the tangential membrane microfiltration technique used by them for clarification of the heat treated whey might be attempted.

Thus, whilst ultrafiltration has been suggested as one step in a process which involves a number of other physicochemical methods, for the separation of fractions containing enhanced concentrations of individual whey proteins, the method of purification as a whole has also involved a variety of other procedures which, when scaled up to produce an industrial process, become both complex and expensive to run.

Thus the provision of a simple and commercially viable process for fractionating whey proteins and in particular α-lactalbumin, has eluded the researchers.

SUMMARY OF THE INVENTION

The ultrafiltration method uses membranes which will allow only molecules up to a given size to pass through into the permeate. Although theoretically the membranes could be constructed to provide any given molecular weight cut-offs in practice they are manufactured to give molecular weight cut-off at 3,000, 10,000, 30,000, 50,000, 100,000 and 500,000. The cut-off is also not precise. For example, although the molecular weight of α-lactalbumin is substantially 14,000, some α-lactalbumin will pass into the permeate when ultrafiltration using a membrane having a molecular weight cut-off of 10,000 (e.g. Romicon PM10 membrane) is practiced on whey. The molecular weight cut-off designated for a given membrane is therefore an average figure.

β-lactoglobulin has a molecular weight about 18,000, but as it normally exists as a dimer it behaves as if it had a molecular weight more in the region of 36,000 or even somewhat larger. It would be expecteds, therefores, that if a liquid containing both α-lactalbumin and β-lactoglobulin were subjected to ultrafiltration using a 30,000 molecular weight cut off membrane that separation of the two proteins would result and the ratio of α-lactalbumin to β-lactoglobulin in the permeate would be considerably higher than in the original liquid. It would also be expected that even using a 50,000 molecular weight cut off membrane that some increase in the ratio would occur due to the apparent molecular weight of the β-lactoglobulin, but that with a 100,000 molecular weight cut off membrane (e.g. a Romicon PM100) substantially no increase would be expected.

It has now been surprisingly found that when such an ultrafiltration is performed using a 100,000 molecular weight cut off membrane on a whey protein concentrate obtained using a 10,000 molecular weight cut off membrane that the ratio of α-lactalbumin to β-lactoglobulin in the permeate is substantially greater in the permeate than in the whey protein concentrate starting material. It has also been surprisingly found that the ratio of α-lactalbumin/β-lactoglobulin in the permeate using a 100,000 molecular weight cut off membrane is not significantly lower than that in the permeate resulting from the use of a 50,000 molecular weight cut off membrane but that the rate of permeation of α-lactalbumin through the 100,000 molecular weight cut off membrane is significantly higher than its rate of permeation through a 50,000 molecular weight cut off membrane. The rate of permeation of the α-lactalbumin through the membrane is important in achieving commercial viability and the higher rate of permeation through the 100,000 molecular weight cut off membrane over that through a 30,000 or 50,000 molecular weight cut off membrane coupled with the surprisingly high ratio of α-lactalbumin/β-lactoglobulin in the permeate resulting from use of a 100,000 molecular weight cut off membrane unexpectedly provides a viable industrial process for producing a commercially viable α-lactalbumin enhanced whey protein concentrate.

According to the present invention therefore, a process is provided for producing an α-lactalbumin enhanced fraction from a liquid containing whey proteins including α-lactalbumin and β-lactoglobulin characterised by the step of subjecting the said liquid to ultrafiltration using a membrane having a molecular weight cut-off of substantially 100,000.

BRIEF DESCRIPTION OF THE DRAWINGS

The advantageous aspects of this invention will be more fully appreciated when viewed in conjunction with the following Detailed Description and the attached drawings, wherein.

DETAILED DESCRIPTION OF THE INVENTION

Figure 1:
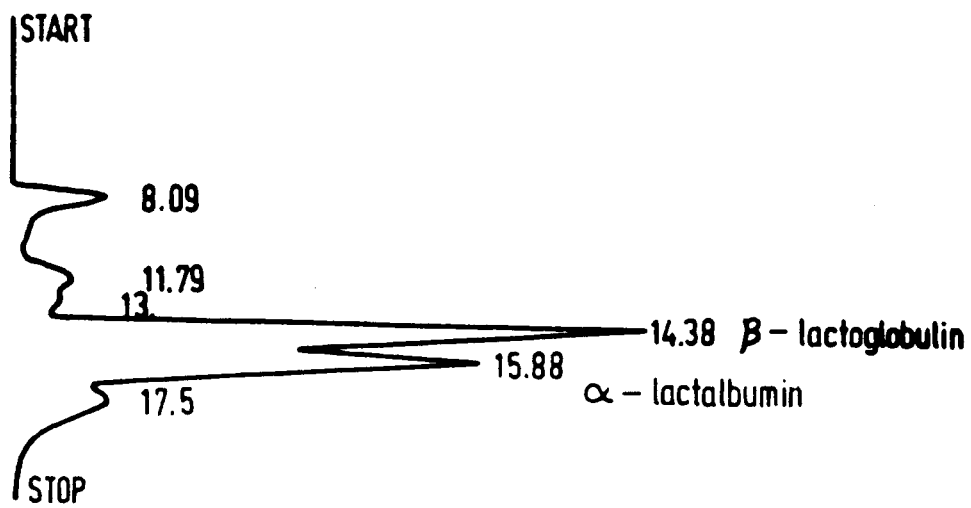
FIG. 1 shows an HPLC profile for the starting material of Example 3, described hereinbelow.

The liquid containing the whey proteins may be whey itself but is preferably a whey protein concentrate or such a concentrate diluted with deionized water (usually to a protein content in the range of about 4–6% by weight) to give optimum results from the particular type of ultrafiltration equipment and UF membrane used. The α-lactalbumin-containing permeate resulting from ultrafiltration of the said liquid through the 100,000 molecular weight cut off membrane is preferably concentrated by further ultrafiltration using an appropriate membrane such as a 10,000 molecular weight cut off membrane. The resulting liquid concentrate may then be dried to form a powder by the usual spray drying method.

The invention will be further illustrated by the following Examples, which are purely illustrative.

The wheys used in the Examples are from Cheddar cheese production, the whey pasteurization conditions being 72° to 73° C./18 sec.

The analysis figures in percent by weight for the liquid whey are:

|  | Liquid Whey |
|---|---|
| Total solids | 6.1 |
| Protein (N × 6.38) | 0.8 |
| Fat | 0.04/0.25* |
| Ash | 0.52 |
| Sodium | 0.053 |
| Potassium | 0.15 |
| Calcium | 0.062 |
| Magnesium | 0.008 |
| Phosphorus | 0.046 |
| pH | 6.3 |

*separated/unseparated

EXAMPLE 1

3750 liters of white Cheddar whey at a pH of 6.18 were subjected to ultrafiltration in an Alfa-Laval UFS-4 plant fitted with Romicon PM10 membrane with a surface area of 10m². The whey was maintained at a temperature of 50° C. and the ultrafiltration resulted in the production of 240 liters of whey protein concentrate with a content of 7.9% protein equivalent to 57% of total solids.

The concentrate so produced was diluted with demineralized water to a 5% protein content (350 liters total volume) and was subjected to ultrafiltration at 50° C. on an Alfa-Laval UFS 4 fitted with Romicon PM100 membranes. This resulted in the production of 78 liters of α-lactalbumin depleted concentrate and 302 liters of an α-lactalbumin enriched permeate containing 1.8% protein equivalent to 4.55% of total solids.

The permeate obtained above was run again through the Alfa-Laval UFS 4 plant fitted with Romicon PM10 membranes and 25 liters of α-lactalbumin rich concentrate were obtained having a 14.1% protein content, equivalent to 16.7% of total solids.

The final liquid concentrate was then spray-dried to obtain 3.5 Kg of powder containing 78.3% protein.

The ratios of α-lactalbumin/β-lactoglobulin (based on HPLC (TSK G3000SW Column) profiles, absorbance at 280 nm) were:

| Starting Whey | 1.1 |
|---|---|
| Step 3 Liquid conc. | 2.0 |

EXAMPLE 2

Using the same conditions and equipment as in Example 1:

i. 1390 liters of whey were concentrated by ultrafiltration (PM10 membranes) to 91 liters having 18.7% by weight solids and 10.6% by weight total protein.

ii. 147 liters of deionized water were added to the concentrate from (i) to reduce the protein concentration to 4.06% by weight. The resulting diluted material was subjected to ultrafiltration using a PM 100 membrane to yield 180 liters of α-lactalbumin rich permeate.

iii. The permeate resulting from (ii) was concentrated by ultrafiltration using a PM10 membrane to 16 liters; the concentrate was spray dried to yield 2.6 kg of powder having the composition:

| Total protein | 80.3% by weight |
|---|---|
| True protein | 59.3% by weight |
| Moisture | 6.4% by weight |

The ratio of α-lactalbumin to β-lactoglobulin (based on the HPLC (TSK G3000SW Column) profiles absorbance at 280nm) was 7:4.

EXAMPLE 3

350 liters of white Cheddar whey were subjected to ultrafiltration (Alfa Laval UFS-4, 4×PM10 at 50° C.) and concentrated to 14 liters having a solids content of 12.5% by weight. 16 liters of deionized water were added to the concentrate and the resultant 30 liters of diluted concentrate subjected to ultrafiltration at 20° C. on an Amicon DC10 unit equipped with an Amicon H5P100 membrane with a surface area of 0.45m² to generate 25.5 liters of α-lactalbumin rich permeate. The permeate was further ultrafiltered at 20° C. using the same Amicon equipment but with H5P10 membrane having a surface area of 0.45m² to produce 3 liters of concentrate. the concentrate was spray dried to yield a powder having the composition:

| Total Protein | 81.6% by weight |
|---|---|
| True protein | 73.6% by weight |
| Total solids | 94.1% by weight |

Figure 2:
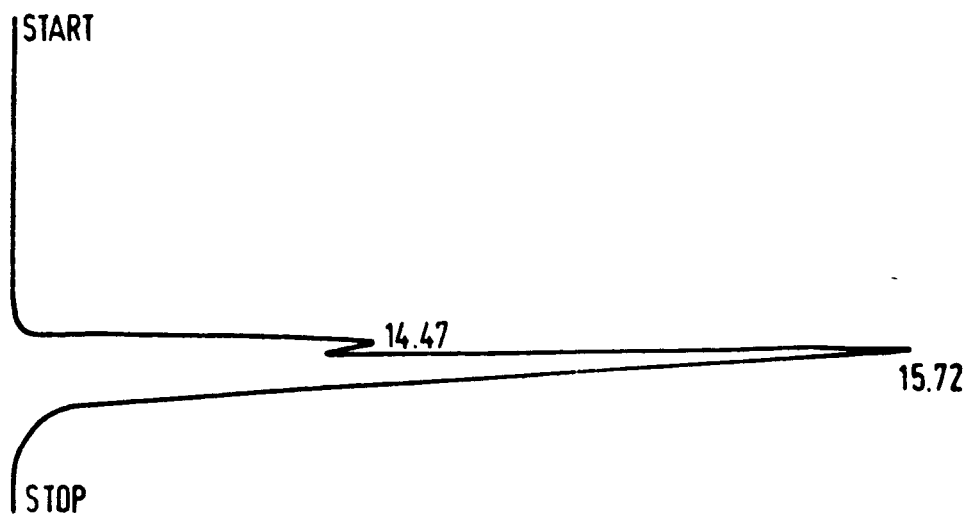
FIG. 2 shows an HPLC profile for the material of Example 3 after treatment in accordance with this invention.

HPLC (TSK G3000SW Column) profiles both for the starting whey and the final product were prepared and are reproduced in the accompanying drawing, FIG. 1 being the profile for the starting whey and FIG. 2 the profile for the final product. The ratio of α-lactalbumin/β-lactoglobulin was 3.0.

I claim:

1. A process for producing an α-lactalbumin-enhanced fraction from a liquid containing whey protein including α-lactalbumin and βlactoglobulin which comprises subjecting said liquid to ultrafiltraiton using a membrane having a molecular weight cut off of about 100,000 to form a permeate having a protein content in which the proportion of α-lactalbumin is enhanced relative to the proportion obtaining in the protein content of said liquid and further ultrafiltering said permeate using a membrane having a molecular weight cut off up to 10,000 to produce a concentrate having an enhanced αlactalbumin content.

2. A process as set forth in claim 1 in which the said liquid containing whey proteins is whey.

3. A process as set forth in claim 1 in which the said liquid is a whey protein concentrate produced by subjecting whey to ultrafiltration using a membrane having a molecular weight cut off of up to 10,000.

4. A process as claimed in claim 3 in which prior to being subjected to ultrafiltration using a membrane having a molecular weight cut off of about 100,000 the whey protein concentrate is diluted with deionized water.

5. A process for producing a whey protein concentrate having an enhanced content of α-lactalbumin which comprises subjecting whey to ultrafiltration using a membrane having a molecular weight cut off of up to 10,000 to produce a first they protein concentrate, diluting the said first whey protein concentrate with deionized water, subjecting the diluted concentrate to ultrafiltration using a membrane having a molecular weight cut off of about 100,000 whereby to produce a permeate having a proteins content containing an enhanced proportion of α-lactalbumin and subjecting the said permeate to ultrafiltration using a membrane having a molecular weight cut off of up to 10,000 to produce a whey protein concentrate having an enhanced content of α-lactalbumin.

6. A process as claimed in claim 5, in which the membranes having a molecular weight cut off of up to 10,000 have a molecular weight cut off of essentially 10,000.

7. A process as claimed in claim 5 in which the first whey protein concentrate is diluted with deionized water to a protein content of from 0.5 to 5.0% by weight.

8. In a process for fractionating a liquid containing whey protein including α-lactalbumin and β-lactoglobulin to produce a fraction in which the proportion of α-lactalbumin relative to the other whey proteins is enhanced the improvement which comprises subjecting the said liquid to ultrafiltration using a membrane having a molecular weight cut off of about 100,000 to produce a permeate having an enhanced proportion of β-lactalbumin relative to the other whey proteins presents.

9. A process as set forth in claim 8 in which the liquid containing whey proteins including α-lactalbumin and β-lactoglobulin is produced by subjecting whey to ultrafiltration using a membrane having a molecular weight cut off of up to 10,000 to produce a concentrate and if desired diluting said concentrate with deionized water.

* * * * *